May 4, 1954   S. D. BLANEY   2,677,143
ELECTRICALLY HEATED WINDSHIELD WIPER BLADE AND ARM
Filed Dec. 26, 1950   2 Sheets-Sheet 1
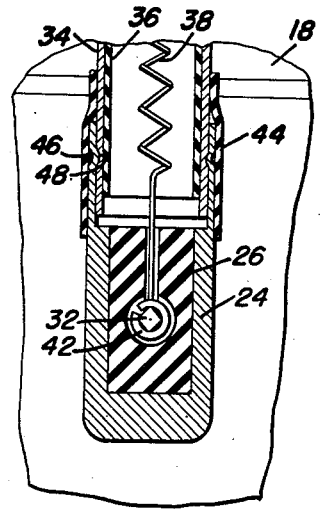
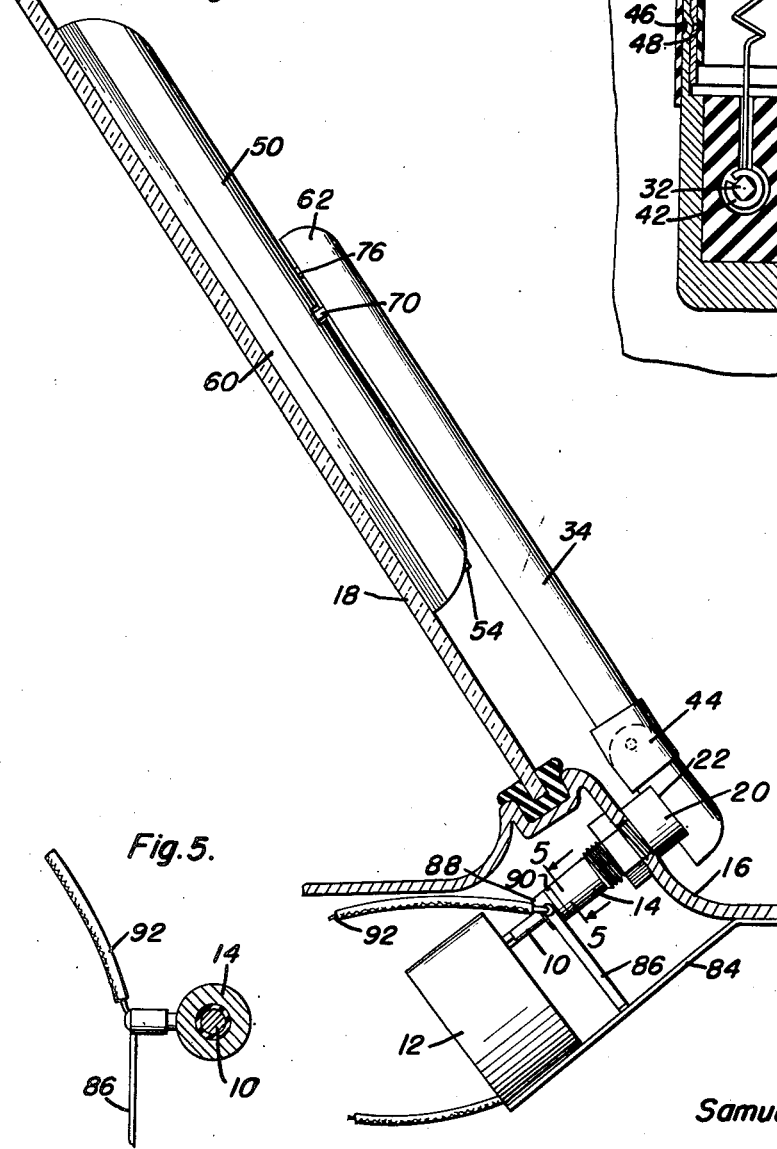
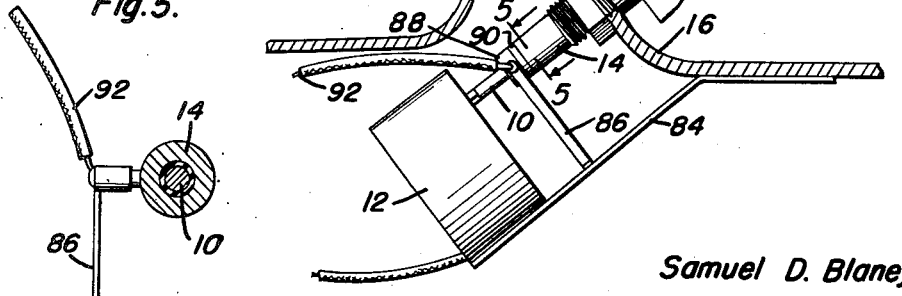
Samuel D. Blaney
INVENTOR.

May 4, 1954          S. D. BLANEY          2,677,143
ELECTRICALLY HEATED WINDSHIELD WIPER BLADE AND ARM
Filed Dec. 26, 1950          2 Sheets-Sheet 2
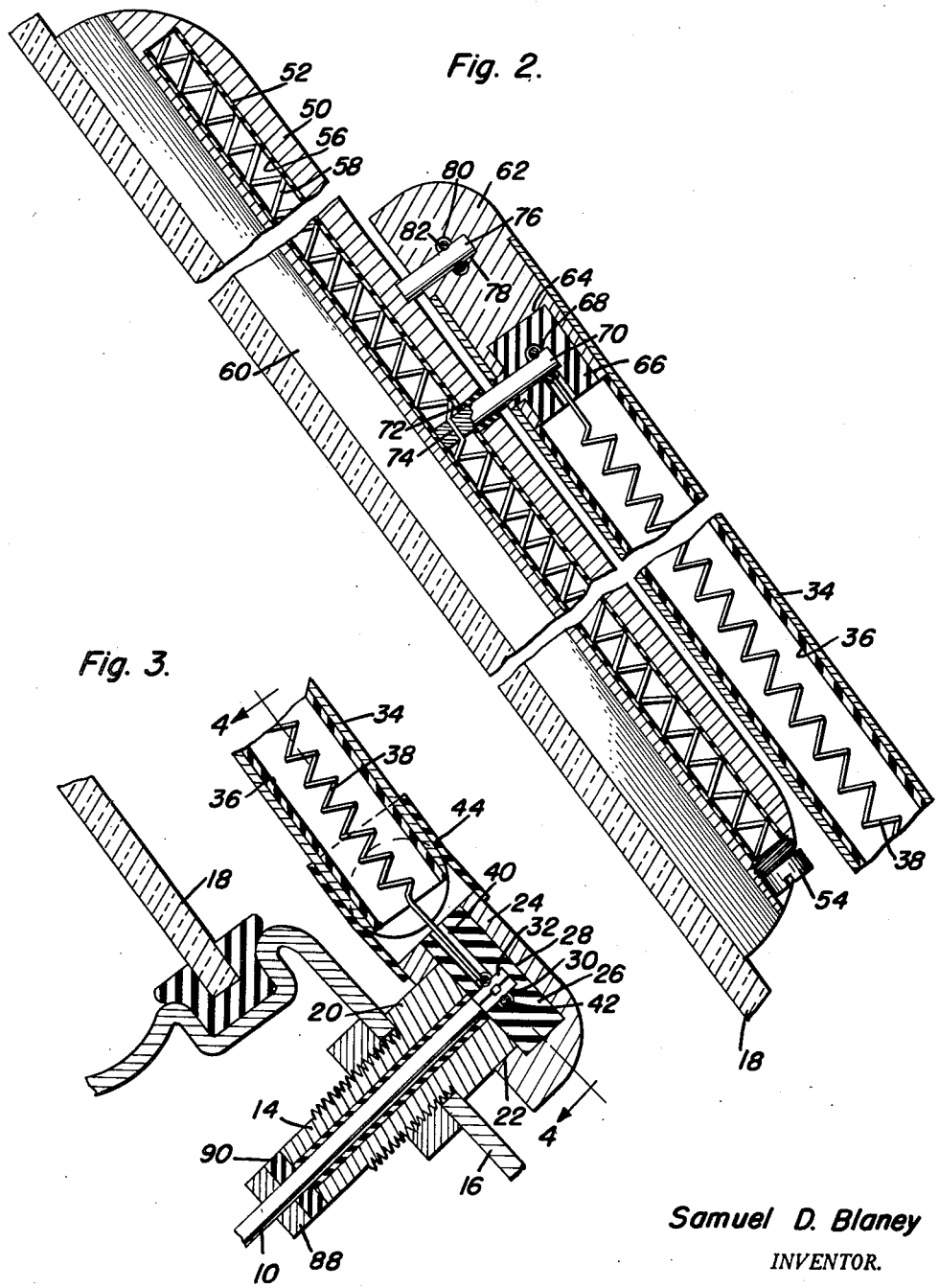
Samuel D. Blaney
INVENTOR.

Patented May 4, 1954

2,677,143

UNITED STATES PATENT OFFICE 2,677,143

ELECTRICALLY HEATED WINDSHIELD WIPER BLADE AND ARM

Samuel D. Blaney, Big Horn, Wyo., assignor of one-half to Gordon A. Blaney, Grey Bull, Wyo.

Application December 26, 1950, Serial No. 202,657

7 Claims. (Cl. 15—250.5)

This invention relates to new and useful improvements in windshield wipers and the primary object of the present invention is to provide an electrically heated squeegee support or casing that will prevent the formation of ice on the support.

Another important object of the present invention is to provide a windshield wiper including a hollow squeegee support having an electrical heating coil therein and embodying novel and improved means for electrically connecting the heating coil to a source of electric current.

A further object of the present invention is to provide a windshield wiper including a squeegee support that is hollow and which houses an electrical heating coil, the support being so constructed as to permit the heating coil to be applied to or removed from the support in a convenient manner for inspection or repair.

A still further aim of the present invention is to provide a windshield wiper that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a sectional view of a vehicle and showing the present wiper applied thereto;

Figure 2 is an enlarged fragmentary vertical sectional view of Figure 1;

Figure 3 is an enlarged detail vertical sectional view showing the manner in which the wiper arm is applied to a rock shaft;

Figure 4 is a sectional view taken substantially on the plane of section line 4—4 of Figure 3; and, Figure 5 is an enlarged sectional view taken substantially on the plane of section line 5—5 of Figure 1.

Referring now to the drawings in detail, wherein for the purpose of illustration, there is disclosed a preferred embodiment of the present invention, the numeral 10 represents a rock shaft that is oscillated by any suitable means, such as an electric motor 12. The shaft 10 is mounted in a bearing 14 that is supported upon a portion 16 of a vehicle beneath the windshield 18.

The enlarged head portion 20 of the bearing 14 is received in a recess 22 provided in a member 24 that will rotate on the head portion 22 and the member 24 will oscillate with the rock shaft 10. An insulator plug 26 is tightly fitted in a recess 28 in the member 24 and includes a multi-sided recess 30 that receives the multi-sided end 32 of the rock shaft 10.

A tubular wiper supporting arm 34 is provided with a non-conductive sleeve 36 therein in which there is received a heating element or wire coil 38. The lower end of the coil 38 extends through a bore 40 in the plug 26 and is connected to a split resilient conductive ring 42 that embraces and yieldingly retains the end 32 of the rock shaft 10 in the socket 30.

The lower open end of the arm 34 is fitted in the upper end of a resilient coupler sleeve 44 and the lower end of the sleeve 44 yieldingly embraces the upper portion of the member 24. Protuberances 46 on the inner walls of the member 24 are received in recesses 48 in the lower end of the arm 34 as shown best in Figure 4 of the drawings.

A squeegee support 50 is associated with the wiper arm 34 and includes a blind bore 52. A closure plug 54 is threaded in the lower open end of the bore 52 and is removable to permit a non-conductive sleeve 56 and a heating element or wire coil 58 to be inserted into the bore 52. A squeegee or resilient strip 60 is carried by the support 50 and rests against the windshield 18.

The upper closed end 62 of the arm 34 includes a recess 64 in which there is fitted an insulator block 66 having a bore or recess 68 that receives one end of a shaft or conductor 70. The other end of the shaft or pin 70 extends through a non-conductive collar 72 fitted in an aperture in the support 50 to enter the sleeve 56 and is provided with a transverse slot or bifurcated end 74 through which the coil 58 extends.

A lug or attaching arm 76 projects laterally from the support 50, above the shaft 70, and enters a recess 78 in the closed upper end 62 of the arm 34. A channel 80 about the recess 78 receives a split resilient ring 82 that yieldingly embraces the lug 76 to retain the lug 76 in the recess 78.

The motor 12 is secured to the portion 16 by a bracket 84 and supports an arm 86 on which there is mounted a ring 88 that embraces the shaft 10. The ring 88 is spaced from one end of the bearing 14 by a non-conductive washer 90. The ring 88 is connected to a source of electric current, such as the battery of the vehicle, by a conductor 92.

In practical use of the present invention, the ends of the coil 58 are grounded to the support and the coils 38 and 58 will be heated during swinging of the arm 34 and the support 50 to aid in preventing the formation of ice on the windshield 18 and to prevent ice from forming and accumulating on the arm 34 or the support 50.

A suitable switch is applied to the conductor 92 and is manually activated to complete a circuit to the coils 38 and 58, thereby permitting the coils 38 and 58 to be energized when desired.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described as preferred embodiment of the invention the same is susceptible to certain changes fully comprehended by the spirit of the invention as herein described and the scope of the appended claims.

Having described the invention, what is claimed as new is:

1. A windshield wiper comprising a conductive rock shaft, a hollow conductive wiper arm mounted on said shaft for oscillation therewith, a first non-conductive sleeve mounted in the arm, a hollow conductive squeegee support, a second non-conductive sleeve mounted within the support, a first heating element positioned within the second sleeve and terminally grounded to the support, a second heating element within the first sleeve and attached to and contacting the rock shaft, a conductor between the heating elements and connecting the arm to the support, means connecting the rock shaft to a source of electric current, a grounding element engaging said support and said arm, and a conductive bearing insulated from and supporting said rock shaft, said bearing being in contact with said arm and adapted to be grounded to a vehicle on which the bearing is mounted.

2. The combination of claim 1 wherein said conductor comprises a pin having its ends extending into said support and said arm respectively, said pin having a bifurcated end receiving said second heating element.

3. The combination of claim 1 wherein said support includes an opening at one end sufficiently large as to permit removal of the second sleeve and the second heating element, and a closure plug for the opening in said support.

4. A windshield wiper comprising a tubular conductive arm adapted to be grounded to a vehicle, means operatively connected to one end of the arm for oscillating the arm, a first heating coil within and insulated from the arm and connected at one end to a source of current, a tubular conductive squeegee support, a second heating coil within and insulated from the support and terminally grounded to the support, a conductive pin extending through the support and the arm and joining said support and arm whereby the support will oscillate with the arm, said pin being terminally engaged with the heating coils.

5. A windshield wiper comprising a bearing sleeve having an insulated liner therein, a conductive rock shaft extending through the liner and having a forward end portion projecting outwardly from the bearing sleeve, a hollow conductive support having a lower end rotatably mounted on the bearing sleeve and connected to the forward end portion of the shaft for movement therewith, a tubular conductive squeegee support, a heating coil within and insulated from the squeegee support and terminally grounded thereto, a conductive pin insulated from the supports and connecting the upper end of the hollow support to an intermediate portion of the squeegee support, said pin being engaged at one end with the heating coil, a second heating coil within the hollow support and insulated therefrom and having an upper end attached to the other end of the pin, a lower end engaged with the shaft, and means electrically connecting the shaft to a source of current, and a grounding pin connecting the supports.

6. The combination of claim 5 wherein said tubular squeegee support includes an open internally threaded end to permit the second heating coil to be extended into or withdrawn from the squeegee support, and a closure plug threaded in said open end.

7. As a new article of manufacture, a windshield wiper comprising a conductive hollow arm adapted to be grounded to a vehicle, a hollow conductive squeegee support, a heating coil disposed within and insulated from the support and having its ends grounded thereto, a second heating coil disposed within and insulated from the arm, a conductive member insulated from the arm and support connecting the arm and support and also connecting the first named coil intermediate its ends to one end of the second coil, said second coil adapted to be connected at its other end to a source of electrical energy, and a grounding connection between the arm and support.

References Cited in the file of this patent

UNITED STATES PATENTS

| Number | Name | Date |
|---|---|---|
| 1,676,561 | Kienast | July 10, 1928 |
| 2,119,587 | Lamb | June 7, 1938 |
| 2,354,440 | Brown | July 25, 1944 |
| 2,550,504 | Vidrick et al. | Apr. 25, 1951 |

FOREIGN PATENTS

| Number | Country | Date |
|---|---|---|
| 311,167 | Great Britain | of 1929 |